US012309299B2

(12) United States Patent
Bear et al.

(10) Patent No.: US 12,309,299 B2
(45) Date of Patent: May 20, 2025

(54) METHOD, SYSTEM AND APPARATUS FOR PROTECTION OF MULTI-DIE STRUCTURES

(71) Applicant: Intel Corporation, Santa Clara, CA (US)

(72) Inventors: Uri Bear, Pardes-Hana Z (IL); Reuven Elbaum, Haifa HA (IL); Elad Peer, Yokneam Ilit Z (IL)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 17/481,771

(22) Filed: Sep. 22, 2021

(65) Prior Publication Data

US 2022/0029838 A1   Jan. 27, 2022

(51) Int. Cl.
   *H04L 9/32* (2006.01)
(52) U.S. Cl.
   CPC .................. *H04L 9/3278* (2013.01)
(58) Field of Classification Search
   CPC .................................................. H04L 9/3278
   See application file for complete search history.

(56) References Cited

U.S. PATENT DOCUMENTS

| | | | | |
|---|---|---|---|---|
| 8,868,923 | B1 * | 10/2014 | Hamlet | G06F 21/00 326/8 |
| 10,027,492 | B1 * | 7/2018 | Wesselkamper | H03K 19/003 |
| 2014/0108786 | A1 * | 4/2014 | Kreft | G06Q 20/3825 713/194 |
| 2014/0225639 | A1 * | 8/2014 | Guo | H03K 5/156 331/46 |
| 2018/0234258 | A1 * | 8/2018 | Peffers | H04L 63/0428 |
| 2019/0026724 | A1 * | 1/2019 | Wade | G06Q 20/341 |
| 2019/0089355 | A1 * | 3/2019 | Plusquellic | H03K 19/00323 |
| 2019/0342090 | A1 * | 11/2019 | Pisasale | H04L 9/0662 |
| 2020/0145235 | A1 * | 5/2020 | Choi | H04L 9/12 |
| 2020/0313911 | A1 * | 10/2020 | Mondello | H04L 9/3268 |
| 2020/0364622 | A1 * | 11/2020 | Sika | H04L 9/0643 |
| 2022/0077858 | A1 * | 3/2022 | Bhunia | H03K 19/17728 |
| 2022/0179950 | A1 * | 6/2022 | Aschauer | G06F 21/55 |
| 2022/0417041 | A1 * | 12/2022 | Howard | H04L 9/14 |

* cited by examiner

*Primary Examiner* — Techane Gergiso
(74) *Attorney, Agent, or Firm* — NICHOLSON DE VOS WEBSTER & ELLIOTT LLP (57) ABSTRACT

The disclosure generally provides methods, systems and apparatus to construct a Physically Unclonable Function (PUF) value for an electronic package based on the package's internal components and their interconnects. In one embodiment, the package is a System-On-Chip (SOC) having a plurality of dielets and a plurality of interconnect connecting the dielets. Each of the dielets and each of the interconnects (at one or more locations) may define an entropy source. each entropy source may have an entropy value. Each entropy source communicates an initial entropy value to a PUF aggregator. The PUF aggregator receives and/or aggregates the various entropies from the various entropy sources to construct the native SOC PUF value. The native SOC PUF value defines the authentic PUF value of the SOC at SOC release. Any deviation from the native SOC PUF value may be deemed a security breach of the SOC.

24 Claims, 6 Drawing Sheets

METHOD, SYSTEM AND APPARATUS FOR PROTECTION OF MULTI-DIE STRUCTURES

BACKGROUND

Physically Unclonable Functions (PUFs) are circuits that create a unique random value drawn from underlying manufacturing variation. They are often used component of a comprehensive security architecture. In the absence of PUFs, keys are provisioned and stored in less secure ways. A primary requirement of PUFs is that the value returned remains constant over the lifetime of the device. This is achieved by applying error correction to the PUF data. Consequently, the array must have a sufficiently low Bit Error Rate (BER). BER is a measure in percentage of unstable bits between two consecutive reads per PUF array so that error correction code (ECC) will be able to correct all the errors. The ECC system must store the redundant data (also known as, the helper data) in non-volatile memory (NVM). The helper data can leak information about the PUF value and so the total amount of helper data—and thus the maximum acceptable BER—is limited. There is a need for an improved PUF circuitry with lower BER.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Cryptographic keys (interchangeably, keys) can be stored in a memory circuit. To prevent a key from being exposed during a physical attack, the memory circuit may be configured to sense when a physical attack is occurring and to react to the attack, for example, by blocking the supply of power to the circuit or by destroying the circuit. Certain circuit logic (hardware and logic implemented thereon) designs provide a fingerprint-like output which may be used as the key.

PUF circuits are generally configured to take advantage of the fact that wire delay and/or gate delay may differ slightly from one device to the next. This is due to slight manufacturing variations in circuit formation. A PUF circuit is implemented using gate logic and may generate a random output. The variations in the manufacturing process cause different delays in each circuit. Thus, making it difficult to copy a PUF circuit even if the copied circuit is physically identical and designed to provide the same output value. Certain PUF circuits are extremely difficult to replicate. The same characteristics of PUF circuits that make them difficult to clone also make them susceptible to generating incorrect output values. In cryptography, entropy is the randomness collected by an operating system or application for use in cryptography or other uses that require random data. The randomness is often collected from hardware sources, either pre-existing ones such as mouse movements or specially provided randomness generators. A lack of entropy can have a negative impact on performance and security. Entropy is a measure of uniqueness of a PUF circuit. The higher the entropy, the smaller and cheaper a PUF can be while retaining the same level of security.

Modern SOCs contain many dielets in a stacked, staggered or combined structure. Signals that travel between the dielets may be exposed to probing and manipulation, while the stack itself may be vulnerable to disassembly, and even reassembly after the introduction of rogue dies, or the re-insertion of dies with compromised security. There is a need to authenticate whether the circuitry (SOC or IC) has not been replaced or tampered.

A conventional technique for addressing this problem uses detectors to sense physical detachment of the dielets of a chip or a System-on-Chip (SOC). Examples of such detectors use analog measurements and custom ring oscillators. The so-called detector-based solutions are easy to bypass as they present a single point of failure.

Another conventional technique uses PUF-based technology and wraps the chip (or SOC) in a metal structure. The metal structure is used as a tamper-evident shield. Any change in the state of the shield is considered evidence of tampering. The PUF-based solutions require specialized metallization to surround the chip in order to detect intrusion into the protected space. Such methods add additional manufacturing complexity and are both cost- and labor-intensive.

The disclosed embodiments provide a system, method and apparatus to protect a multi-die chip in a robust and cost-effective manner. Among others, the disclosed solutions generate an SOC-assembly dependent key which is used by other entities and do not have a single point of failure. While conventional PUF-based technologies use die-to-die process variations, in an embodiment according to the disclosed principles, an inter-die connectivity variation is also used to extract the intrinsic information related to the entire package, as well as, unique information related to any of the assembled dies. This package-intrinsic information (or distributed entropy) depends on the manufacturing variation from all connected dies as well as variations resulting from manufacturing variations in connectivity between the dies. The PUF structure is thus distributed amongst the entropies of the dies and their interconnect(s). The disclosed embodiments generate a distributed per-package value that changes upon any disassembly or re-assembly of the die structure. The distributed per-package value is a unique (i.e., native) value which may be used to authenticate the package components.

In modern SOCs, secret data is shared and transferred between dielets. The complex die-to-die trust relationships depend on secret keys, configuration and other data transferred on horizontal or vertical busses within the package. The data transfer paths may be compromised by attackers that can disassemble the die stack, probe internal points, replace dies within the stack and even rebuild the structure in a way that enables signal probing and man-in-the-middle attacks.

The disclosed principles block hacking attempts by enabling an SOC security controller and/or other in-package entities to detect chip attacks even if the attack was done when SOC power was turned off. Among others, the disclosed principles enable a direct blocking of the compromised secrets by using the generated value as a key for decrypting the secret information. Thus, any package- or chip-level attack would change the key (i.e., native PUF value) and render the extracted information null and void.

In one embodiment, the disclosure provides a distributed PUF value which uses the die-to-die connections as part of the PUF's entropy source. In another embodiment, the die-to-die connection (i.e., interconnect) may be used as the only entropy source. In still another embodiment, the die-to-die interconnects in combination with one or more entropy sources (e.g., the dielets as an entropy source) is used to define a distributed PUF. Such exemplary combinations improve tamper detection over the conventional art. Tampering of an exemplary structure may be readily detected by reverse engineering the dies and the connections therebetween. If the exemplary SOC has been tampered, then altering any property of the die-to-die connection would alter the secure key (native or original PUF value) and thus reveal the SOC as no longer secure.

Hard Intellectual Property block (HIP) refers to a chip core with a physical implementation optimized for performance, power and area in a specific target process technology. A typical PUF structure is comprised of cells that use the die-to-die variations in order to create a multi-bit value that is different per die even if the dies were manufactured on the same wafer using the same masks. In one embodiment, this is achieved by using the minute manufacturing variations in the HIP and developing the raw values in a Soft IP block into a wide (multi-bit) key that can then be used to secure data at rest and data in motion using various encryption schemes.

In certain embodiments, the disclosure incorporates the die-to-die connections (i.e., the entropy from an interconnect) into the PUF entropy source scheme such that any change in the analog attributes of the die-to-die connection (e.g., resistance, capacitance, inductance of vias, pads, solder balls etc.) by an attacker (e.g., changing the length, width of wires, incorporating extra logic or wires or even just disassembly and re-assembly of the same dies in a similar structure after some modification or extraction of secrets) would result in a different value delivered by the PUF's entropy source and eventually by the whole PUF structure. Because this scheme delivers both a per-die key as well as a per-package key, the disclosed embodiments increases the security gain.

Figure 1:
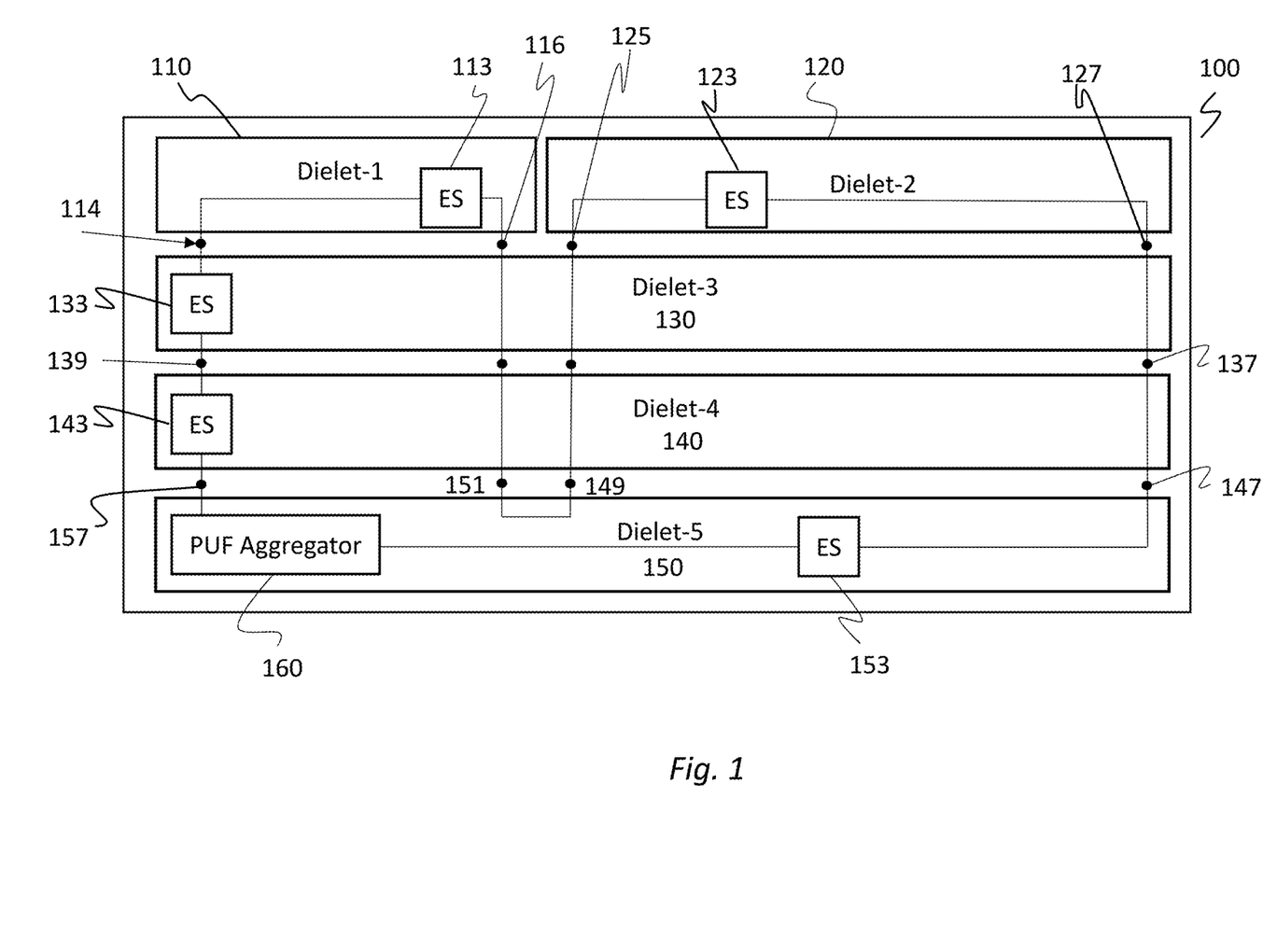
FIG. 1 is an exemplary embodiment of a circuitry structure according to one embodiment of the disclosure.

FIG. 1 is an exemplary embodiment of a package structure according to one embodiment of the disclosure. In FIG. 1, structure 100 may define an SOC having multiple dielets (110, 120, 130, 140 and 150). In an alternative embodiment, structure 100 may define an integrated circuit (IC) with multiple SOC (i.e., each dielet in FIG. 1 may define an independent SOC). For simplicity, the disclosed principles are illustrated in relation to an SOC. The disclosed principles apply equally to an integrated circuit having multiple SOCs.

In the embodiment of FIG. 1 where SOC 100 includes multiple dielets, each dielet is shown as an entropy source (ES). Each ES may be one of a local or an intra-die entropy source. A local entropy source me be determined by metal interconnects, logical cells, propagation delay or other physical features of the die. Intra-die ES may be due to RLC variations, wire lengths or other physical anomalies of the intra-die interconnect. By way of example, dielet-1 which is identified as element 110 in FIG. 1, define ES 113. Dielet 110 communicates directly with dielet 130 (Dielet-3) via two interconnects on each side of dielet 110. Each of the two interconnect defines an ES. Thus, FIG. 1 shows intra-die interconnects 114 and 116. Dielet 130 (Dielet-3) define entropy source 133. Dielet 130 and dielet 140 (Dielet-4) are coupled through two interconnects and each interconnect provides a distinct ES (ES 137 and 139). Dielet 140 (Dielet-4) is connected to dielet 150 (Dielet-5) through four interconnects (147, 149, 151 and 157); each of which provides an entropy source. Dielet 150 also defines ES 153.

SOC 100 also includes PUF Aggregator 160. PUF Aggregator 160 maybe a virtual processor (e.g., computer logic), an actual processor (e.g., circuitry) or a combination of a virtual and an actual processor (e.g., firmware). The PUF Aggregator collects entropy (e.g., entropy values) from all entropy sources and generates a package level signature. In FIG. 1, PUF Aggregator 160 is shown as part of dielet 150 (Dielet-5). In alternative embodiments, PUF Aggregator 160 may be a stand-alone processor, whether virtual or actual, and maybe integrated with SOC 100 (or IC 100) or be apart from SOC 100 (or IC 100). For simplicity, the term package will be used herein to refer to both SOC and IC structures.

The package contains several dielets and interconnects (which may be horizontal and/or vertical). An embodiment of the disclosure aims at aggregating entropy from all or some of the package components. For this, a path that traverses some or all of the dielets and some or all of the interconnects may be created. Local entropies may be aggregated and unified by a processor (e.g., a PUF aggregator) to create a unique native or original value.

The dielets of FIG. 1 illustrate an arrangement where the interconnects are predominantly vertical. However, the disclosed principles are not limited thereto, and an exemplary package may contain several dielets with one or more horizontal and interconnect. The disclosed principles aim at aggregating entropy from some or all of the package components. In one application, a path that traverses all dielets and some or all interconnects may be created. Local entropies (i.e., marked as ES in FIG. 1) and intra-die entropy sources (marked as solid dots in the interconnects) are aggregated and unified by the PUF aggregator to create a unique value. In alternative applications, one or more local entropy values may be aggregated with one or more intra-die entropy values at the PUF aggregator to construct a native PUF value for the package. The native PUF value may be a unique multi-bit key. The value created by the PUF aggregator depends on, and is a function of all (or selected portions) of the package components. This value can be used to authenticate the entire package. In some embodiments, this value may be used to authenticate portions of the package.

In an exemplary application (not shown), some or all of the dielets may hold a unique PUF aggregator relying on the same (or different) paths. Thus, each aggregator may produce its own unique value (the values created may be dielet-unique, but may rely on information from the entire package—thus, replacing any package component will affect all the values). This technique allows each dielet to verify that the package it belongs to is untampered. In yet another embodiment, the PUF aggregator may be distributed among several dielets as further described below.

Figure 2:
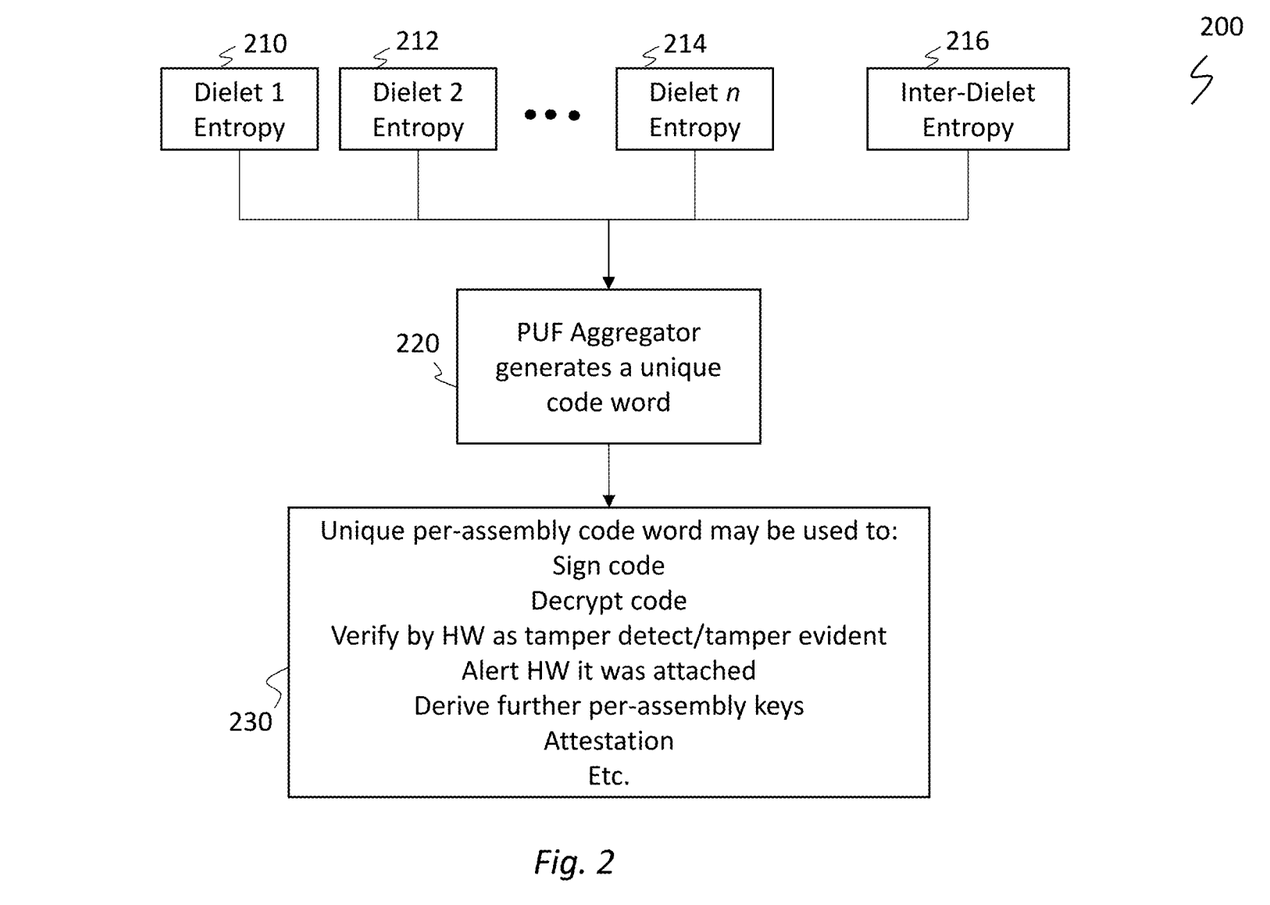
FIG. 2 is a logical description of an exemplary application.

FIG. 2 is a logical description of an exemplary application. The logical structure of FIG. 2 is illustrative and non-limiting. The logic of FIG. 2 may be considered as implemented in three stages. In the first stage, a plurality of entropy sources generate information which may be used at a later stage to form a unique code word or key. In FIG. 2, each of the in dielets generates an entropy value based on its unique attribute. That is, each of dielet 210, dielet 212, dielet 214 generate unique and entropies as a function of their minute process variations. FIG. 2 shows dielets 1 through n as entropy sources (ES). While each of the shown dielets provides an entropy value, the disclosed principles are limited thereto. In certain embodiments, a select one or more dielets may be used as an ES. In addition, Inter-dielet ES 216 may generate additional entropy values. Inter-dielet entropy source 216 may reflect one intra-die connection or multiple intra-die connections. In certain embodiments, one or more intra-die connection may be selectively used as an ES.

The second stage includes PUF generator 220 which receives entropy information from each of sources 210, 212, 214 and 216 of the first stage. PUF generator 220 then generates a unique code word based on the received information. The code word may be considered as the native SOC PUF value. PUF generator 220 may comprise an actual processor, a virtual processor or a combination of an actual and a virtual processor. Moreover, PUF generator 220 may be integrated with the SOC or the IC package or may be external to the package.

In the next stage of the process, the unique per-assembly code word of the second stage (i.e., generated by PUF Aggregator 220) may be used to authenticate the package. This information may also be stored at a memory circuitry. Such authentication may include, for example, generating and using a signature code, creating a decryption code (key), verifying by hardware (HW) if it detects tampering or if it finds evidence of potential tampering, alert HW or Software (SW) that it was attacked, derive or generate further per-assembly keys, and use for attestation of authenticity or other applications. In exemplary embodiment, the tampering alert is communicated to an external source. The external source may be, for example, the administrator or a third-party investigator.

Intra-die entropy sources have been used in recent years to create PUFs in multiple ways. For example, arbiter PUFs use race conditions between logic cells as entropy source; Random Access Memory (RAM) PUFs use process variations in bistable cells as their entropy source. Ring-oscillator based PUFs use propagation delay variations as their entropy source. Importantly, the physical entropy source underlying all these PUF constructions is minute process variations. Inter-die connectivity (e.g., Intel's Foveros™, (including Foveros Omni interconnect, Foveros Direct interconnect) Embedded Multi-die Interconnect Bridge (EMIB), Through-Silicon Via (TSV) technology, stacked dies and all other multi-die package techniques) contains entropy by construction. It is believed that other interconnect techniques contain at least comparable amount of variations which may predicate the basis for entropy construction. The electrical and physical variations can be used as PUF entropy source similarly to the way PUFs are constructed inside dielets (for example, signal propagation delay through the interconnects is directly affected by the variations in interconnect length, capacitance, resistance, etc.)

Figure 3A:
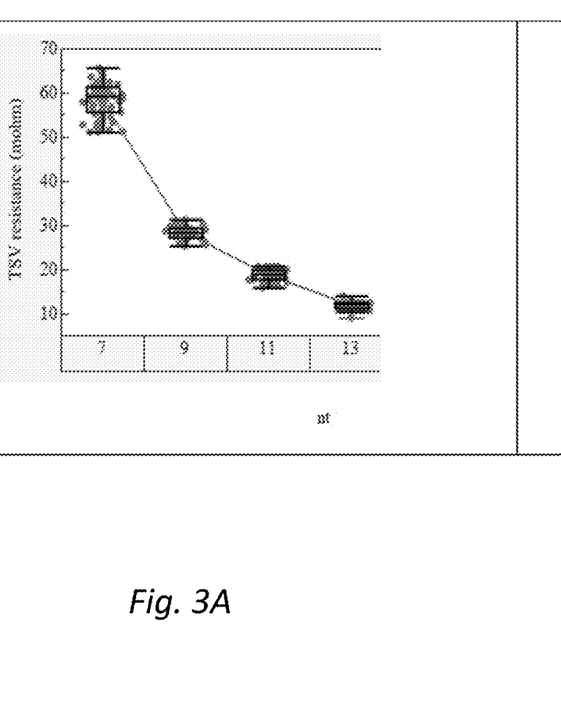
FIG. 3A shows the relationship between TSV resistance (mOhms) for different TSV diameters (micrometers).
Figure 3B:
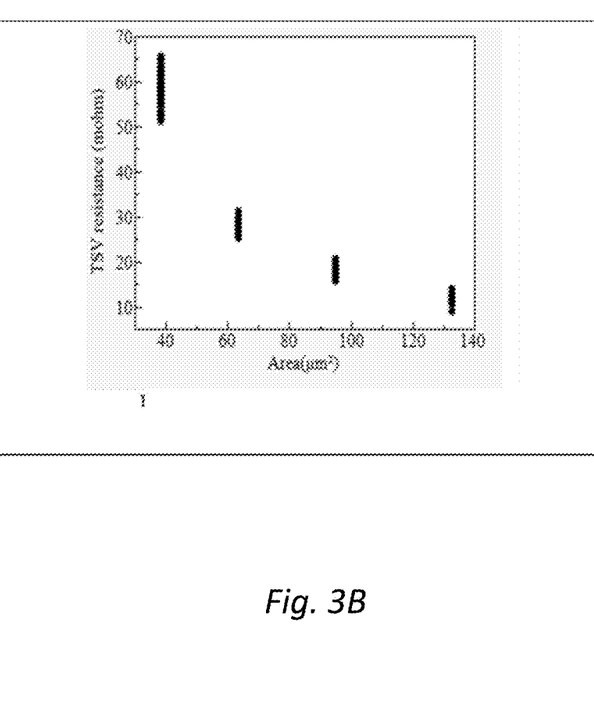
FIG. 3B shows TSV resistance (mOhms) variations as a function of TSV area (Micrometers squared).

FIGS. 3A and 3B show clear TSV electrical variations that result from the manufacturing process. Specifically, FIG. 3A shows the relationship between TSV resistance (mOhms) for different TSV diameters (micrometers). It can be seen that resistance decreases with increase in diameter. FIG. 3B shows TSV resistance (mOhms) variations as a function of TSV area (Micrometers squared). The error bars in the chart show that even when one tries to fabricate many TSVs with the exact same diameter there will still measure different resistivities which define the minute process variations described herein.

PUF Construction.

In an exemplary PUF construction, the PUF value is constructed in an aggregator block. This can be similar to the use of conventional PUFs. For example, arbiter PUF can be constructed so that the different components traverse through multiple dielets (the arbiter aggregator itself may be distributed among several dielets). The following exemplary embodiments for implementing the PUF aggregator illustrate some of the disclosed principles.

In one embodiment, one of the dielets may comprise an aggregator. The aggregator may use the entropy of all dielets/interconnects to create its value. For example, if a ring oscillator PUF is implemented, all the components of the ring oscillator (e.g., inverters) may be in the same dielet but the interconnects between the inverters may pass through other dielets.

In another embodiment, the aggregator may be distributed among different dielets. The different dielets may belong to the same SOC. For example, if a ring oscillator PUF is implemented, components of the ring oscillator (e.g., inverters) may be distributed among different dielets.

In still another embodiment, some or all of the dielets may comprise their own aggregator but still rely on information from the entire package. In this embodiment, each dielet may obtain a unique value which may or may not be the same value as the one in other dielets.

In yet another embodiment, the interconnects can be used within logical cells (e.g., an inverter, a flipflop or other logical cells may be split between several dielets). This may be implemented independently or in addition to incorporating the interconnects only between cells as suggested above. These and other embodiments may be used, for example, in DRAM PUFs, Bistable PUFs, Arbiter PUFs, Ring oscillator PUFs, etc.

Use of PUF to Validate Package Authenticity.

Using the PUF output can attest authenticity (both internally and externally) of the package. For example, the PUF value may be used as a simple detector by comparing its hash to an expected value. In another example, the PUF value may be used as one cryptographic key in a key derivation scheme. Any information encrypted by a key derived from this value would become useless if the package is tampered.

Use of PUF to Attest Package Authenticity.

The disclosed embodiments address the need to provide an evidence of package contents authenticity both internally and externally. For attestation to an external entity, a dielet may use its knowledge of the distributed PUF.

Other Uses of PUF Construction.

The PUF construction described in the disclosed embodiments may be used for all common PUF uses by each dielet that creates or obtains its PUF value. The disclosed principles incorporate distributed entropy sources into a native PUF value. Once constructed, the PUF value can be used at will.

Resilience to Reverse Engineering Attacks.

The disclosed embodiments are resilient to any attack that compromises the structural integrity of the package (SOC or IC). Such attack attempts will cause the PUF value to change and can assist in, among others, (i) preventing the secret information from being disclosed even with no power supplied, and (ii) enabling measures to be taken by the package security controller when power is restored. These reactions to a security compromise of the package will occur even if the security breach was done when the device was completely without power and even if it is re-assembled before applying power.

Figure 4:
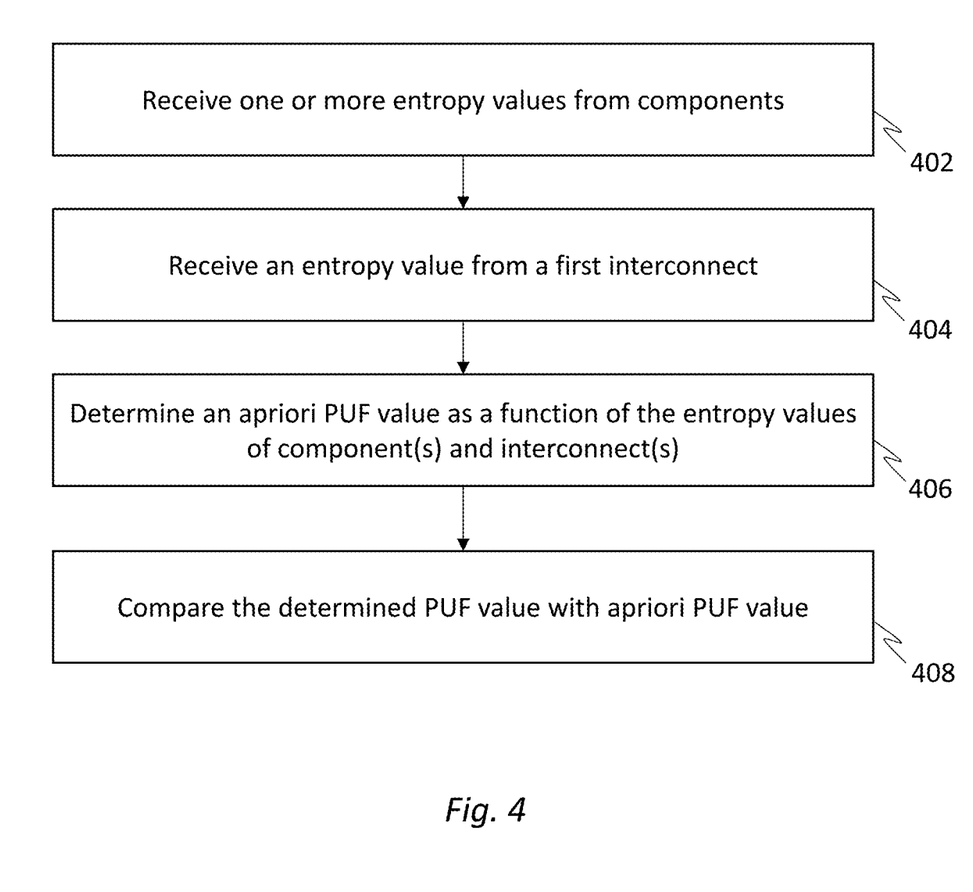
FIG. 4 is a flow diagram for implementing an exemplary embodiment of the disclosure

FIG. 4 is a flow diagram for implementing an exemplary embodiment of the disclosure. These steps maybe implemented at a processor, for example, through machine instructions. The processor may be integrated with a dielet of an electronic package such as SOI or IC. The electronic package may include several components such as dielets. In some embodiments, the processor may define a controller circuitry in communication with a memory circuitry. In another embodiment, the controller may comprise a PUF aggregator.

At step 402, the PUF aggregator receives a one or more entropy values from entropy sources of the package. Each entropy source may comprise an electronic component. In one embodiment the electronic component may be dielet. In another embodiment, the electronic component may be an SOI. The PUF aggregator may receive an entropy value from each, or some, of the electronic components.

At step 404, the PUF aggregator receives an entropy value from at least one interconnect connecting at least two of the components. The interconnect entropy source may be singular or may include more than one interconnects. In one example, the interconnect entropy source may include an entropy node (or source) from each of the interconnects between the components of the package. In another components, certain select interconnects may be used as the entropy source(s).

For each of steps 402, 404 a logical (or actual) electronic circuit associated with each entropy source may determine an entropy value and communicate it to the PUF aggregator. In this manner, each of the entropy sources determines its own entropy value and the PUF aggregator construct a native SOC PUF value by aggregating and/or combining the received entropy values. The SOC PUF value may be determined according to the desired combination of the received values.

At step 406, the PUF aggregator determines a package PUF value. This may define the native or the original SOC PUF value. The native PUF value may be constructed from the entropy values of received from the components (i.e., dielets) as well as the entropy values of the one or more interconnect source(s). The PUF value may be stored at a memory circuitry associated with the electronic package (SOC or IC) and used as the native value for subsequent authenticity checks as shown in step 408. If a subsequently-determined PUF value deviates from the native PUF value, it may be assumed that the electronic package has been tampered.

The embodiment of FIG. 4 is an exemplary representation of a specific embodiment. In a more general case, the different entropies are collected together and at a combined path (e.g., at a single path that traverses the interconnects and some dielets to provide the PUF aggregator a signal that instantly depends in all the entities it traverses). While FIG. 4 suggest collecting the entropy values in series by first accessing one dielet, than the interconnect, and so on, the disclosed embodiments are not limited thereto.

Figure 5:
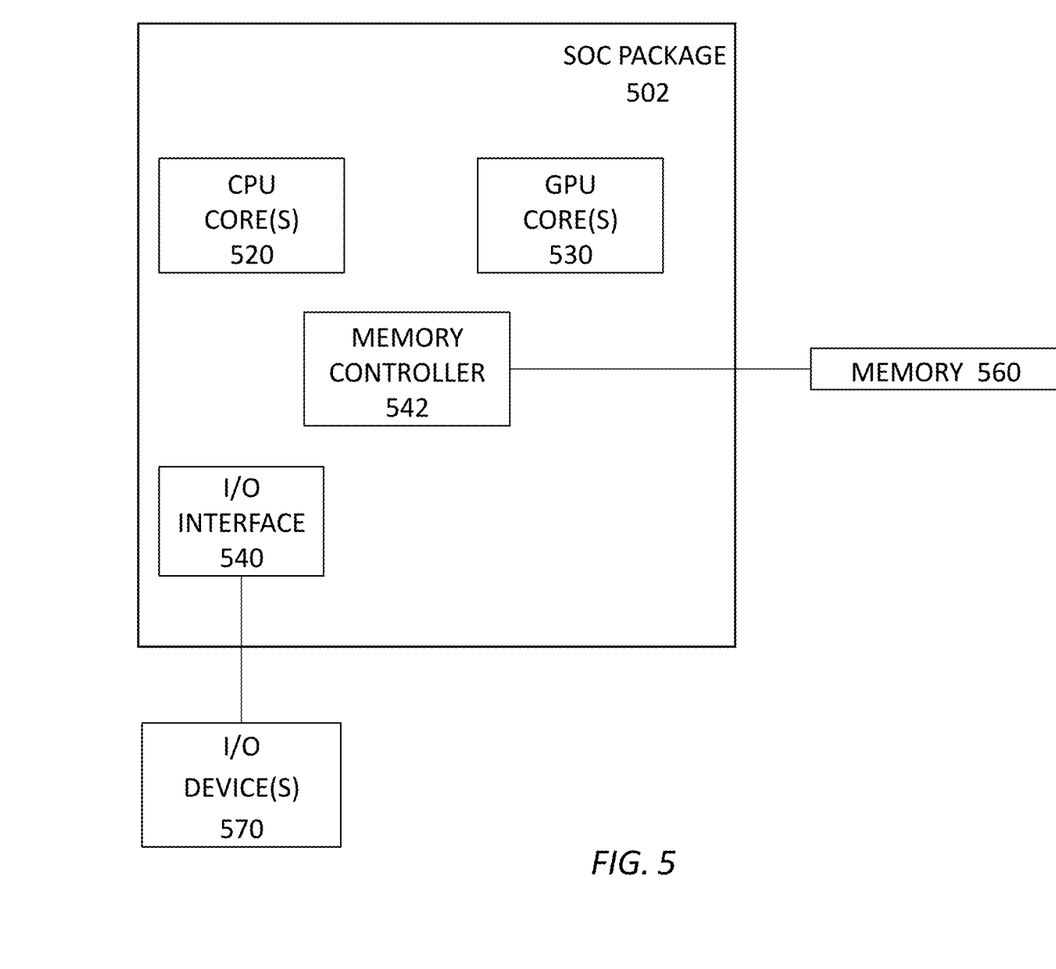
FIG. 5 shows a circuit diagram according to another embodiment of the disclosure for a PMOS-centric PUF.

FIG. 5 illustrates an exemplary chipset that may be used with the disclosed PUF array. By way of example, SOC package 502 may be used in connection with the PUF array to implement the secure key validation check as discussed above. SOC 502 includes one or more Central Processing Unit (CPU) cores 520, one or more Graphics Processor Unit (GPU) cores 530, an Input/Output (I/O) interface 540, and a memory controller 542. In certain embodiments, memory controller 542 comprises PUF aggregator. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 502 may include one or more other components, e.g., as discussed with reference to the other figures herein. In one embodiment, SOC package 502 (and its components) is provided on one or more Integrated Circuit (IC) die, e.g., which are packaged into a single semiconductor device.

SOC package 502 may be coupled to a memory 560 via the memory controller 542. Though not shown, memory 560 (or a portion of it) can be integrated on the SOC package 502. Memory 502 may store instructions executable on CPU Cores 520 or GPU Cores 530. The instructions may cause SOC package 502 to implement chip authentication steps according to certain disclosed embodiments.

The I/O interface 540 may be coupled to one or more I/O devices 570, e.g., via an interconnect and/or bus such as discussed herein with reference to other figures. I/O interface and I/O devices may be optionally integrated into the SOC 502. I/O device 570 may be integrated into SOC package 502 as General Purpose I/O (GPIO). In certain embodiments, an external I/O device(s) 570 may include one or more of a keyboard, a mouse, a touchpad, a display, an image/video capture device (such as a camera or camcorder/video recorder), a touch screen, a speaker, or the like. SOC package 502 (and the disclosed PUF circuits) may be part of a larger circuitry such as a board, an integrated circuit or a processing system.

Figure 6:
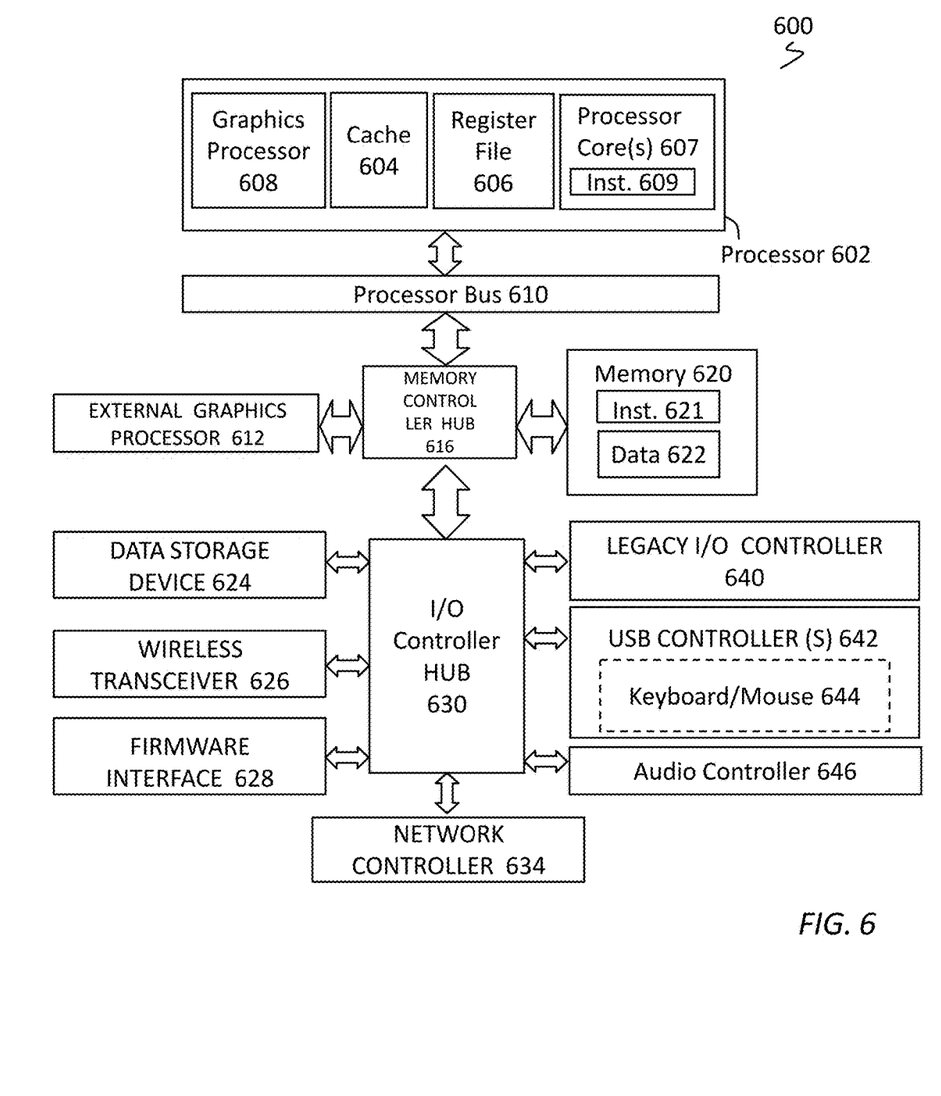
FIG. 6 is a block diagram of a processing system 600, according to an embodiment of the disclosure.

FIG. 6 is a block diagram of a processing system 600, according to an embodiment of the disclosure. In various embodiments the system 500 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SOC or SOC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 may also include, be couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random-access memory (DRAM) device, a static random-access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Example 1 is directed to a System-On-Chip (SOC), comprising: a plurality of dielets, each dielet defining an independent entropy source and providing a respective dielet entropy score; at least one interconnect to connect a first and a second dielets of the plurality of dielets, the at least one interconnect defining an interconnect entropy source having an interconnect entropy score; a PUF aggregator to receive the respective dielet entropy scores from each of the plurality of dielets and from the at least one interconnect entropy score, the PUF aggregator to process one ore more of the received entropy scores to construct an native Physically Unclonable Function ("PUF") value; a memory circuitry to store the native SOC PUF value.

Example 2 is directed to the SOC of Example 1, further comprising a comparator to compare the native SOC PUF value with a subsequent SOC PUF value to determine SOC tampering.

Example 3 is directed to the SOC of Example 1, wherein the PUF aggregator determines the native SOC PUF value as a function of the dielet entropy scores and the interconnect entropy score.

Example 4 is directed to the SOC of Example 1, wherein the interconnect comprises one of Foveros interconnect, Foveros Omni interconnect, Foveros Direct interconnect, Embedded Multi-die Interconnect Bridge (EMIB) and Through-Silicon Via (TSV) technology.

Example 5 is directed to the SOC of Example 1, wherein the interconnect entropy score is determined as a function of at least one or more of resistance, capacitance, inductance, physical composition, length and width of the interconnect.

Example 6 is directed to the SOC of Example 1, wherein the dielet entropy score is determined based on physical variations among the plurality of dielets.

Example 7 is directed to a method to determine authenticity of a System-On-Chip (SOC), the method comprising: receiving a respective dielet entropy score from each of a plurality of dielets of the SOC, each dielet defining an independent entropy source and having a respective entropy score; receiving an interconnect entropy scope from at least one interconnect connecting a first and a second dielet of the plurality of dielets, the at least one interconnect defining an entropy source; constructing an native SOC PUF value as a function of one or more of the received entropy scores, wherein the native SOC PUF value defines the native SOC PUF value.

Example 8 is directed to the method of Example 7, further comprising storing the native SOC PUF value at a memory circuitry.

Example 9 is directed to the method of Example 7, further comprising comparing a subsequent SOC PUF value with the native SOC PUF value to determine SOC tampering.

Example 10 is directed to the method of Example 7, further comprising constructing the native SOC PUF value as a function of the dielet entropy scores and the interconnect entropy score.

Example 11 is directed to the method of Example 7, wherein the interconnect comprises one of Foveros interconnect, Foveros Omni interconnect, Foveros Direct interconnect, Embedded Multi-die Interconnect Bridge (EMIB) and Through-Silicon Via (TSV) technology.

Example 12 is directed to the method of Example 7, wherein the interconnect entropy is determined as a function of at least one or more of resistance, capacitance, inductance, physical composition, length and width of the interconnect.

Example 13 is directed to the SOC of Example 1, wherein the dielet entropy is determined as a function of physical variations among the plurality of dielets.

Example 14 is directed to a non-transitory machine-readable medium comprising instructions that, when executed by computing hardware, including a System-On-Chip (SOC), cause the SOC to: receive a respective dielet entropy score from each of a plurality of dielets of the SOC, each dielet defining an independent entropy source and having a respective entropy score; receive an interconnect entropy scope from at least one interconnect connecting a first and a second dielet of the plurality of dielets, the at least one interconnect defining an entropy source; construct an native SOC PUF value as a function of one or more of the received entropy scores, wherein the native SOC PUF value defines the native SOC PUF value.

Example 15 is directed to the medium of Example 14, wherein the instructions further cause the native SOC PUF value to be stored.

Example 16 is directed to the medium of Example 14, further comprising comparing a subsequent SOC PUF value with the native SOC PUF value to determine SOC tampering.

Example 17 is directed to the medium of Example 14, wherein the instructions further cause the SOC to construct the native SOC PUF value as a function of the dielet entropy scores and the interconnect entropy score.

Example 18 is directed to the medium of Example 14, wherein the interconnect comprises one of Foveros interconnect, Foveros Omni interconnect, Foveros Direct interconnect, Embedded Multi-die Interconnect Bridge (EMIB) and Through-Silicon Via (TSV) technology.

Example 19 is directed to the medium of Example 14, wherein the interconnect entropy is determined as a function of at least one or more of resistance, capacitance, inductance, physical composition, length and width of the interconnect.

Example 20 is directed to the medium of Example 14, wherein the dielet entropy is determined as a function of physical variations among the plurality of dielets.

Example 21 is directed to an integrated circuit (IC), comprising a plurality of System-On-Chip (SOC) units, each SOC comprising: a plurality of dielets, each dielet defining an independent entropy source and providing a respective dielet entropy score; at least one interconnect to connect a first and a second dielets of the plurality of dielets, the at least one interconnect defining an interconnect entropy source having an interconnect entropy score; a PUF aggregator to receive the respective dielet entropy scores from each of the plurality of dielets of the SOC units of the IC and from the at least one interconnect entropy score, the PUF aggregator to process one ore more of the received entropy scores to construct an native IC Physically Unclonable Function ("PUF") value; a memory circuitry to store the native IC PUF value.

Example 22 is directed to the IC of Example 21, further comprising a comparator to compare the native IC PUF value with a subsequent IC PUF value to determine IC tampering.

Example 23 is directed to the IC of Example 21, wherein the PUF aggregator determines the native IC PUF value as a function of all of the dielets' entropy scores and the interconnect entropy score.

Example 24 is directed to the IC of Example 21, wherein the interconnect comprises one of Foveros interconnect, Foveros Omni interconnect, Foveros Direct interconnect, Embedded Multi-die Interconnect Bridge (EMIB) and Through-Silicon Via (TSV) technology.

It should be noted that the disclosed embodiments are exemplary and non-limiting and are not to be construed as limiting of the disclosed principles.

What is claimed is:

1. A System-On-Chip (SOC), comprising:
   a plurality of dielets, each dielet defining an independent entropy source and providing a respective dielet entropy score;
   at least one interconnect to connect a first and a second dielets of the plurality of dielets, the at least one interconnect defining an interconnect entropy source having an interconnect entropy score;
   a Physically Unclonable Function ("PUF") aggregator to receive the respective dielet entropy scores from each of the plurality of dielets and from the at least one interconnect entropy score, the PUF aggregator to process one or more of the received entropy scores to construct a native SOC Physically Unclonable Function ("SOC PUF") value;
   a memory circuitry to store the native SOC PUF value.

2. The SOC of claim 1, further comprising a comparator to compare the native SOC PUF value with a subsequent SOC PUF value to determine SOC tampering.

3. The SOC of claim 1, wherein the PUF aggregator determines the native SOC PUF value as a function of the dielet entropy scores and the interconnect entropy score.

4. The SOC of claim 1, wherein the interconnect comprises one of Foveros interconnect, Foveros Omni interconnect, Foveros Direct interconnect, Embedded Multi-die Interconnect Bridge (EMIB) and Through-Silicon Via (TSV) technology.

5. The SOC of claim 1, wherein the interconnect entropy score is determined as a function of at least one or more of resistance, capacitance, inductance, physical composition, length and width of the interconnect.

6. The SOC of claim 1, wherein the dielet entropy score is determined based on physical variations among the plurality of dielets.

7. The SOC of claim 1, wherein the dielet entropy is determined as a function of physical variations among the plurality of dielets.

8. A method to determine authenticity of a System-On-Chip (SOC), the method comprising:
   receiving a respective dielet entropy score from each of a plurality of dielets of the SOC, each dielet defining an independent entropy source and having a respective entropy score;
   receiving an interconnect entropy score from at least one interconnect connecting a first and a second dielet of the plurality of dielets, the at least one interconnect defining an entropy source;
   constructing a native SOC Physically Unclonable Function ("SOC PUF") value as a function of one or more of the received entropy scores;
   wherein the native SOC PUF value defines an authentic PUF value of the SOC.

9. The method of claim 8, further comprising storing the native SOC PUF value at a memory circuitry.

10. The method of claim 8, further comprising comparing a subsequent SOC PUF value with the native SOC PUF value to determine SOC tampering.

11. The method of claim 8, further comprising constructing the native SOC PUF value as a function of the dielet entropy scores and the interconnect entropy score.

12. The method of claim 8, wherein the interconnect comprises one of Foveros interconnect, Foveros Omni interconnect, Foveros Direct interconnect, Embedded Multi-die Interconnect Bridge (EMIB) and Through-Silicon Via (TSV) technology.

13. The method of claim 8, wherein the interconnect entropy is determined as a function of at least one or more of resistance, capacitance, inductance, physical composition, length and width of the interconnect.

14. At least one non-transitory machine-readable medium comprising instructions that, when executed by computing hardware, including a System-On-Chip (SOC), cause the SOC to:
receive a respective dielet entropy score from each of a plurality of dielets of the SOC, each dielet defining an independent entropy source and having a respective entropy score;
receive an interconnect entropy score from at least one interconnect connecting a first and a second dielet of the plurality of dielets, the at least one interconnect defining an entropy source;
construct a native SOC Physically Unclonable Function ("SOC PUF") value as a function of one or more of the received entropy scores, wherein the native SOC PUF value defines an authentic PUF value of the SOC.

15. The medium of claim 14, wherein the instructions further cause the native SOC PUF value to be stored.

16. The medium of claim 14, further comprising comparing a subsequent SOC PUF value with the native SOC PUF value to determine SOC tampering.

17. The medium of claim 14, wherein the instructions further cause the SOC to construct the native SOC PUF value as a function of the dielet entropy scores and the interconnect entropy score.

18. The medium of claim 14, wherein the interconnect comprises one of Foveros interconnect, Foveros Omni interconnect, Foveros Direct interconnect, Embedded Multi-die Interconnect Bridge (EMIB) and Through-Silicon Via (TSV) technology.

19. The medium of claim 14, wherein the interconnect entropy is determined as a function of at least one or more of resistance, capacitance, inductance, physical composition, length and width of the interconnect.

20. The medium of claim 14, wherein the dielet entropy is determined as a function of physical variations among the plurality of dielets.

21. An integrated circuit (IC), comprising:
a plurality of System-On-Chip (SOC) units, each SOC comprising:
a plurality of dielets, each dielet defining an independent entropy source and providing a respective dielet entropy score;
at least one interconnect to connect a first and a second dielets of the plurality of dielets, the at least one interconnect defining an interconnect entropy source having an interconnect entropy score;
a Physically Unclonable Function ("PUF") aggregator to receive the respective dielet entropy scores from each of the plurality of dielets of the SOC units of the IC and from the at least one interconnect entropy score, the PUF aggregator to process one ore more of the received entropy scores to construct a native IC PUF value;
a memory circuitry to store the native IC PUF value.

22. The IC of claim 21, further comprising a comparator to compare the native IC PUF value with a subsequent IC PUF value to determine IC tampering.

23. The IC of claim 21, wherein the PUF aggregator determines the native IC PUF value as a function of all of the dielets' entropy scores and the interconnect entropy score.

24. The IC of claim 21, wherein the interconnect comprises one of Foveros interconnect, Foveros Omni interconnect, Foveros Direct interconnect, Embedded Multi-die Interconnect Bridge (EMIB) and Through-Silicon Via (TSV) technology.

* * * * *